(12) United States Patent
Berry, Sr. et al.

(10) Patent No.: US 6,325,384 B1
(45) Date of Patent: Dec. 4, 2001

(54) TANK PISTON WITH IMPROVED SEAL AND WIPER

(75) Inventors: Thomas E. Berry, Sr., East Alton; Christopher K. Duncan, Wood River, both of IL (US)

(73) Assignee: Transportation Leasing Corporation, St. Louis, MO (US)

( * ) Notice: Subject to any disclaimer, the term of this patent is extended or adjusted under 35 U.S.C. 154(b) by 0 days.

(21) Appl. No.: 09/476,166

(22) Filed: Dec. 30, 1999

Related U.S. Application Data

(63) Continuation-in-part of application No. 08/926,821, filed on Sep. 10, 1997, now Pat. No. 6,027,123.

(51) Int. Cl.[7] ..................... F16J 9/20
(52) U.S. Cl. ............ 277/437; 277/441; 277/442; 220/226
(58) Field of Search ............. 277/435, 437, 277/442, 569, 572, 441; 220/224, 226

(56) References Cited

U.S. PATENT DOCUMENTS

| | | | |
|---|---|---|---|
| 2,144,082 | * | 1/1939 | Randall . |
| 2,859,061 | | 11/1958 | Reid . |
| 3,043,468 | | 7/1962 | Horner . |
| 3,055,533 | * | 9/1962 | Reese et al. . |
| 3,125,346 | | 3/1964 | Poltorak . |
| 3,307,733 | | 3/1967 | DeBock . |
| 3,828,988 | | 8/1974 | Berry . |
| 3,926,332 | * | 12/1975 | Okamoto ........... 220/226 |
| 4,004,708 | * | 1/1977 | Boyd ............... 220/224 |
| 4,130,217 | * | 12/1978 | Hills et al. ........ 220/226 |
| 4,147,274 | * | 4/1979 | Hall et al. ......... 220/226 |
| 4,178,000 | | 12/1979 | Kuttner . |
| 4,355,736 | | 10/1982 | Schumacker et al. . |
| 4,371,090 | | 2/1983 | Ogarek et al. . |
| 4,449,713 | * | 5/1984 | Ishido et al. . |
| 4,532,800 | * | 8/1985 | Coleman ............. 73/308 |
| 4,721,235 | | 1/1988 | Watson . |
| 4,842,160 | * | 6/1989 | Piso ................. 220/225 |
| 5,114,054 | | 5/1992 | Watson . |
| 5,137,283 | * | 8/1992 | Giarrusso et al. . |
| 5,290,045 | * | 3/1994 | Terauchi et al. . |
| 5,341,726 | * | 8/1994 | Watson .............. 92/80 |
| 5,385,081 | | 1/1995 | Sneddon . |

FOREIGN PATENT DOCUMENTS

3725360-A1 * 2/1989 (DE) .

* cited by examiner

*Primary Examiner*—Anthony Knight
*Assistant Examiner*—Alison K. Pickard
(74) *Attorney, Agent, or Firm*—Greensfelder, Hemker & Gale, P.C.

(57) ABSTRACT

A tank piston is shown with an improved seal and wiper. The piston is used in conjunction with tanks used for transporting semi-solid and viscous materials such as grease, oil, ink, and the like. The improved seal consists of an annular rubber member with a hollow chamber filled with an open cell foam material such as polyurethane, or a gel such as silica gel. The material in the chamber is compressible and expandable to provide a seal about the piston. Optionally, the piston is provided with an annular wiper structure that extends about the outer forward periphery of the piston, and is forwardly angled at about 45° relative to an axis of the piston. The wiper has a beveled end that makes contact with the interior surface of the tank to provide a cleaning action. A complementary second wiper may be added near the outer rearward periphery of the piston. A preferred embodiment is also shown that uses a tiered support assembly.

19 Claims, 4 Drawing Sheets

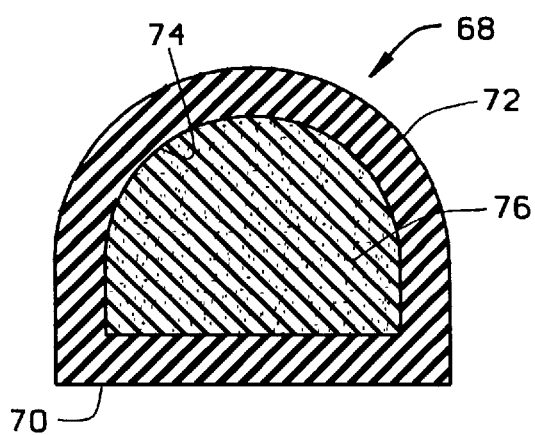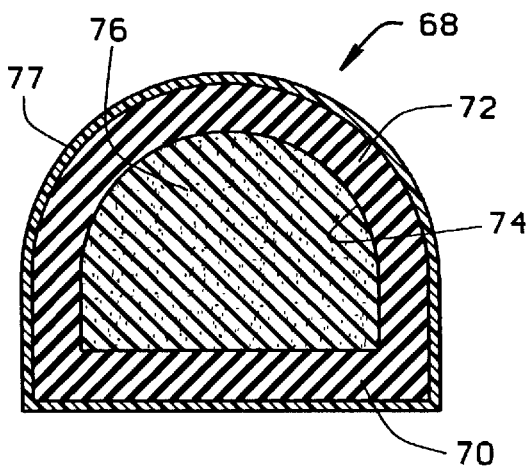
FIG. 3                    FIG. 3A
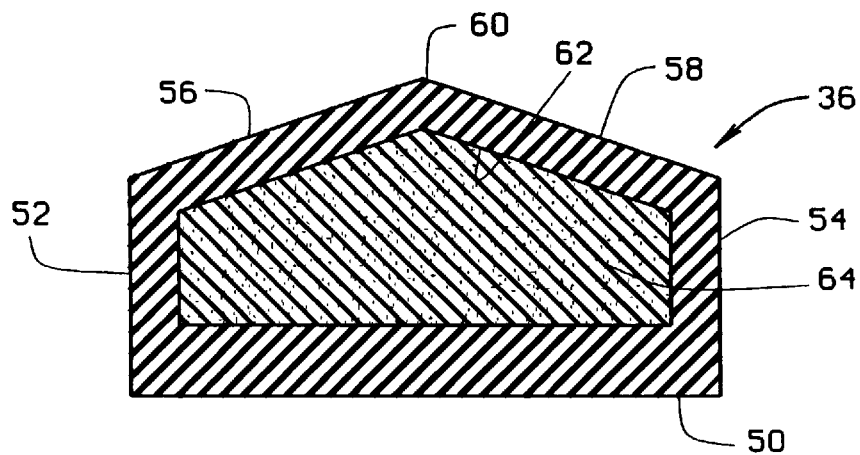
FIG. 4
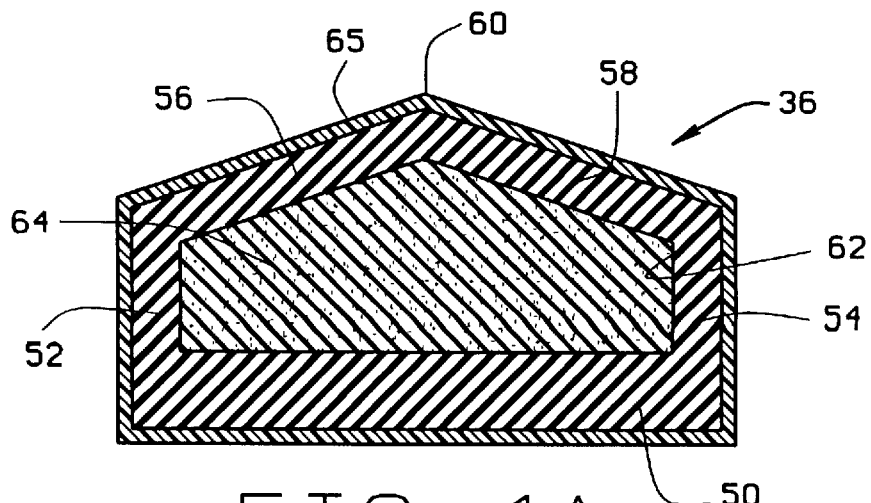
FIG. 4A

TANK PISTON WITH IMPROVED SEAL AND WIPER

This is a continuation-in-part of application for United States Patent, Ser. No. 08/926,821 filed Sep. 10, 1997, now U.S. Pat. No. 6,027,123, the specification of which is incorporated herein by reference.

FIELD OF THE INVENTION

The present invention relates generally to systems for the transportation and/or storing of viscous materials such as grease, oil, ink, and the like, and semisolid materials such as comminuted food products, and the like, in bulk quantity and, more particularly, to a tank and piston structure therefor.

BACKGROUND OF THE INVENTION

Tanks for the bulk transport and/or storage of semisolid and liquid materials of the kind comprising a tank with a movable piston therein are well known in the art. Examples of such tanks may be found in U.S. Pat. Nos. 3,828,988; 4,721,235; 5,114,054; and 5,341,726. The tanks usually have follower pistons with pneumatically expandable seals surrounding one end of the tank for seating the piston relative to the tank to accommodate changes in the interior cross-section of the tank. The seal is generally positioned between circumferential flanges affixed to the outer surface of the tank in order to axially retain the seal during movement of the piston. The tanks also generally have pads positioned about the piston and extending radially outwardly therefrom for preventing canting of the piston as the piston moves within the tank.

As indicated above, the prior art seals are usually hollow and capable of being filled with air to cause the seals to expand. The hollow portion or chamber of the seal may be filled and depleted of air through a valve structure in communication with the chamber and disposed within the piston. The valve is accessible through a rear opening in the piston. Since the seal is naturally between the outer surface of the piston and the inner surface of the tank, and is in contact with the inner surface of the tank as the piston reciprocates within the tank, the seal is subject to abrasion and wear. Also, because the seal is pneumatic, there is always the possibility that a puncture will develop and render the seal useless. Thus, although pneumatic seals are efficient, they are prone to failure. Furthermore, the friction created on the seal by the reciprocating piston may occasionally cause the seal to roll out of position. Additionally, pneumatic seals are difficult to fasten securely to the piston because they cannot be punctured by a fastener.

It has been suggested that the design of the seal be such as to effect a wiping action against the inner surface of the tank. This however, is subjecting the seal to more wear and exposing the seal to a greater possibility of failure.

In view of the above, it is an object of the present invention to provide an improved seal structure for a tank piston.

It is another object of the present invention to provide a piston seal that will accommodate expansion while providing a longer wear life.

It is yet another object of the present invention to provide a tank piston structure that includes an improved wiper structure.

It is still another object of the present invention to provide a tank piston that has an improved wiper structure for the inner surface of the tank, and having an improved seal structure that moves along the inner surface of the tank with less friction.

SUMMARY OF THE INVENTION

According to one aspect of the present invention, an elastic, deformable seal structure for a tank piston includes an interior, annular chamber that is filled with an open celled foam material. The seal is preferably defined by an annular base coupled to a crown portion, which together define the interior, annular chamber. The open celled material may be rubber, polyurethane, or like resilient material that is compressible and is elastic to expand back substantially to its original volume.

The seal is substantially annular and disposed on the outer surface of the piston and surrounding the same, preferably near one end, and is axially retained by a circumferential groove or channel disposed in the outer surface of the piston.

In one embodiment of the seal, the crown portion is defined by a dome-shaped member. In another embodiment, the crown portion is defined by two axially spaced, parallel walls, each coupled to an angled top wall. The top walls join to form an apex.

According to another aspect of the present invention, the seal is surrounded by a friction reducing layer, possibly of Teflon®, which may be shrink-wrapped around the seal. The friction reducing layer specifically reduces the kinetic coefficient of friction between the seal and the inner surface of the tank.

According to yet another aspect of the present invention, a circumferential wiper structure extends from the outer surface of the piston near the discharging end of thereof, and is in abutting relationship with the inner surface of the tank. The end of the wiper abutting the inner surface of the tank preferably includes a bevel. Optionally, a second wiper may be disposed at the opposite end of the tank.

In one form, the wiper is an elongated circumferential ring that extends at a 45θ angle, relative to an axis of the piston, towards the inner surface of the tank. The ring may be formed of a suitable plastic.

In the preferred embodiment of the seal, a support strip is placed between the open cell foam material and the base portion. The support strip is preferably made of the same material as the seal itself.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and is therefore not to be considered limiting of its scope, for the invention may admit to other equally effective embodiments. Reference the appended drawings, wherein:

FIG. 3 is an enlarged sectional view of the seal depicted in FIGS. 1 and 2;

FIG. 3A is an enlarges sectional view of the seal of FIG. 3 with an optional friction reducing layer;

FIG. 4 is an enlarged sectional view of an alternate embodiment of the present seal depicted in FIGS. 1 and 2A;

FIG. 4A is an enlarged sectional view of the seal of FIG. 4 with an optional friction reducing layer;

DETAILED DESCRIPTION

Figure 1:
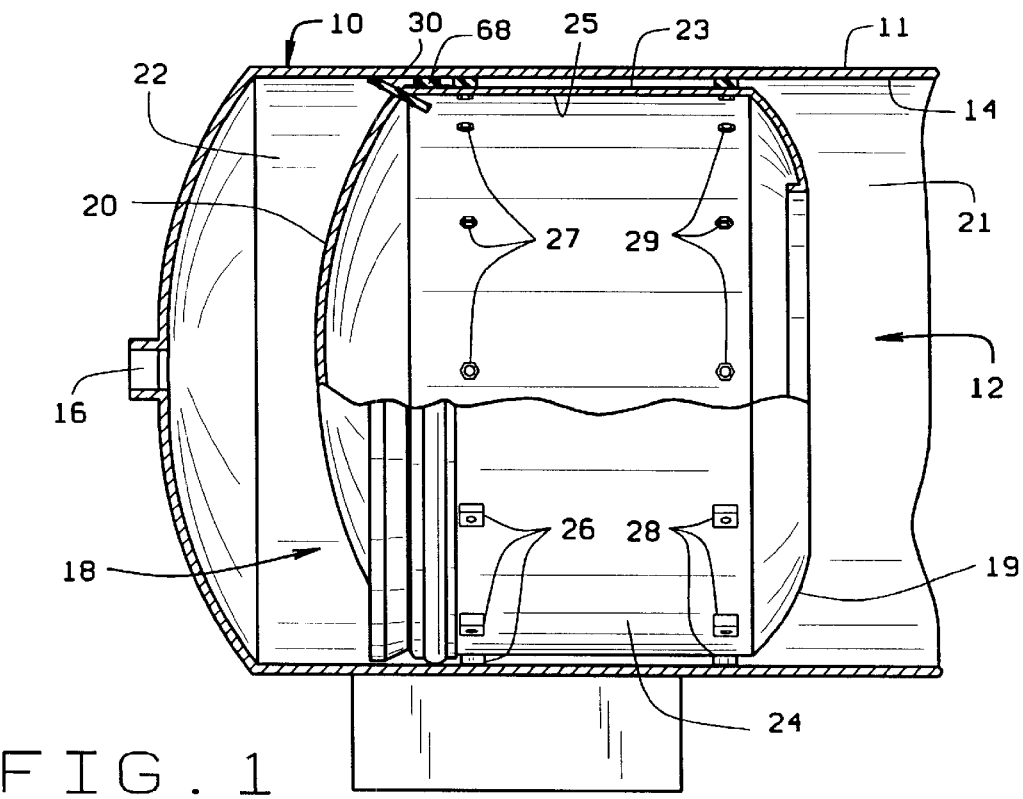
FIG. 1 is a longitudinal cross-sectional view of an end portion of a tank showing a piston in partial cross-section, movable within the tank, in accordance with the present invention.

Referring now to FIG. 1, there is shown a portion of a tank, designated 10, defined by a generally cylindrical wall 11, preferably formed of a suitable metal in order to effectively contain the material to be stored and/or transported therein (hereinafter "the material"). The wall 11 defines a generally cylindrical interior volume or space 12 of the tank that is bounded by an interior or inner surface 14 of the wall 11. The tank 10 has an opening 16 at one end thereof, which for convenience will be deemed the front of the tank 10. The opening 16 is a combination inlet and outlet for introducing and removing the material respectfully into and out of the tank volume 12.

Disposed within the volume 12 is a tank piston 18 of a generally cylindrical configuration and preferably formed of a suitable metal. The outside diameter of the piston 18 is slightly less than the inner diameter of the tank 10 such that the piston 18 is movable back and forth within the tank 10. The piston 18 divides the whole interior volume 12 of the tank 10 into a front volume 22 forward of a curved front portion 20 of the piston 18 and a rear volume 21 rearward of a curved rear portion 19 of the piston 18. The front and rear volumes 22, 21 are variable depending on the position of the piston 18 within the tank. The front volume 22 receives and holds the material. The more material, the larger front volume 22 becomes with the rear volume 21 becoming less as the piston 18 moves rearward. As the material exits the tank 10 the rear volume 21 becomes greater with the front volume 22 becoming less as the piston 18 moves forwardly. It should be immediately understood that the above describes the introduction of the material into the front volume 22 of the tank 10 via the opening 16 and the evacuation of the material from the front volume 22 of the tank 10 via the opening 16.

The piston 18 is defined by the curved front portion or wall 20 and the rear portion or wall 19 and a middle, generally cylindrical portion or wall 23. Disposed on the outside surface or periphery 24 of the wall 23 of the middle portion 23 are two sets of anti-canting pads 26 and 28. The anti-canting pads 26 are disposed in an annular pattern about the piston 18 proximate the front portion 20 while the canting pads 28 are disposed in an annular pattern about the piston 18 proximate the rear portion 19. The anti-canting pads 26, 28 extend radially outward from the surface 24 and are respectfully fastened thereto by bolts that extend through the wall 23 and are secured by nuts 27, 29 on the inner surface 25. The anti-canting pads 26, 28 abut the inner surface 14 of the wall 11 to prevent the piston 18 from canting within the tank 10. The pads are preferably of a low friction material (e.g. nylon) to permit the piston 18 to move freely within the tank 10. Of course, alternate devices may be used to accomplish this result. The pads 26, 28 are axially and circumferentially spaced on the piston surface 24 accordingly.

Figure 2:
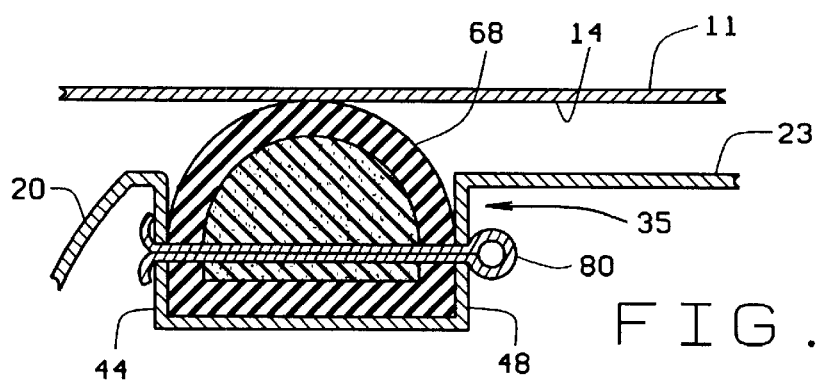
FIG. 2 is an enlarged sectional view of a portion of the piston showing the seal mounted in its channel.
Figure 2A:
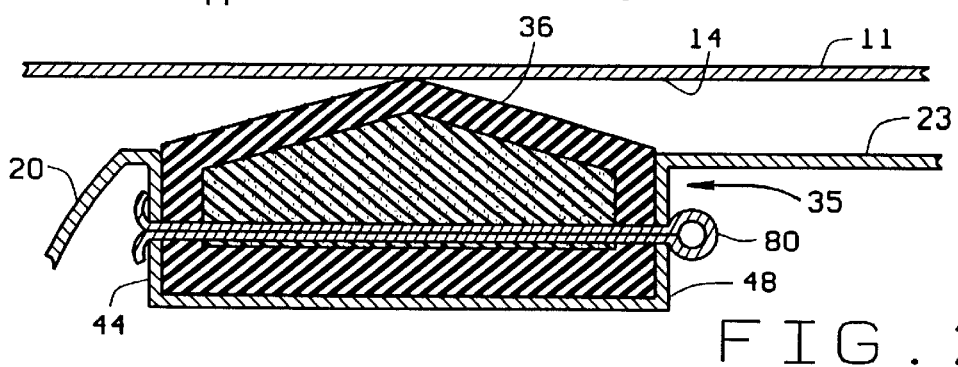
FIG. 2A is an enlarged sectional view of a portion of the piston showing an alternate embodiment of the present seal mounted in its channel.

Also disposed on the outer surface or periphery 24 of the piston 18 between the front portion 20 and the pads 26 is a circumferential groove or channel 35 (see FIG. 2). Disposed at least partly within the channel 35 is an elastic seal structure 68. FIG. 2A shows an alternate seal structure 36 disposed within channel 35.

With additional reference to FIGS. 3 and 3A the seal 68 is preferably formed of an elastic material such as rubber, VITON®, neoprene, nitrile, or other suitable material. The seal 68 is defined by an annular base 70 formed of a rubber as again described above, to which is coupled an annular dome-shaped (in cross-section) cap or crown 72. The cap 72 and base 70 define an annular cavity or chamber 74 which is filled with an open celled foam 76. Such open celled foam material 76 may be a rubber compound, polyurethane, or the like which is elastically compressible, to provide and impart a resiliency effect to the seal structure 68. Optionally, a gel, such as silica may be used in place of the open celled foam material 76.

As shown in FIG. 3A, an optional an outer layer 77 may be disposed about the seal 68 to reduce the kinetic coefficient of friction as the seal moves across the inside surface 14 of the tank 10. The outer layer 77 may be made of any suitable low friction material, such as teflon, rayon, nylon, or any high-density alkenes. It is preferable that such outer layer 77 be shrink wrapped around the seal 68 to provide the best friction reduction.

Referring to FIGS. 2A, 4, and 4A there is shown an alternative embodiment of a seal, generally designated 36 that may be used. It should here be understood that various seal configurations may work, as long as they have an interior cavity filled with an open celled foam as described above with reference to the seal 36. The seal 36 is defined by an annular base portion 50, a first or left perpendicular annular wall portion 52, a second or right perpendicular annular wall portion 54, a first or left angled annular wall portion 56, and a second or right angled annular wall portion 58. The first perpendicular wall portion 52 is attached to the base portion proximate one end thereof, while the second perpendicular wall portion 54 is attached to the base portion proximate another end thereof. The first angled wall portion 56 is attached at one end to a top end of the first perpendicular wall portion 52, while the second angled wall portion 58 is attached at one end to a top end of the second perpendicular wall portion 54. The other ends of the first and second angled wall portions 56, 58 are joined together to form an apex 60. Preferably, the wall portions are integrally formed such that the seal 36 is substantially seamless. The wall portions 52, 54, 56, 58, form a crown or cap, and an annular interior hollow, cavity, or chamber 62 that is filled with an open celled foam material 64. Such open celled foam material 64 may as described above in reference to celled foam material 76. To prevent the base 50 from bowing outward (i.e. to keep it flat) it is possible with this embodiment of the seal 36 to provide a base 50 that is somewhat thicker than the other walls 52, 54, 56, 58. An optional outer layer 65 may be disposed around seal 36 in the same manner as outer layer 77.

It should here be understood that various seal configurations may work, as long as they have an interior cavity filled with an open celled foam as described above with reference to the seals 36 and 68. With any embodiment of the seal that may be used, a plurality of cotter pins 80 may be used to further prevent the seal from rolling out of the channel 35. The cotter pins 80 may be inserted through two sidewalls 44, 48 defined by channel 35 and through the celled foam material of the seal.

Referring back to FIG. 2A again, the seal 36 is where the apex 60 is abutting the inner surface 14, and the first and second angled wall portions 56, 58 are radially downwardly compressed. Compression of the seal 36 between the piston and the inner surface of the tank prevents the intrusion of the material from the front volume 22 and the rear volume 21. Also, because the cavity 62 of the seal 36 is filled with the resilient foam material 64, the walls of the seal tend to radially outwardly expand, particularly if the base 50 is made thicker than the remaining walls. Thus, if a puncture or rupture occurs in the seal, there will be no deflation of the seal as in "air seals" nor a significant loss of the sealing effect. It should be recognized that after a certain amount of wear and tear, even the present seal would need replacement. However, the lifetime of the present seal is generally greater than the "air seals."

Figure 5:
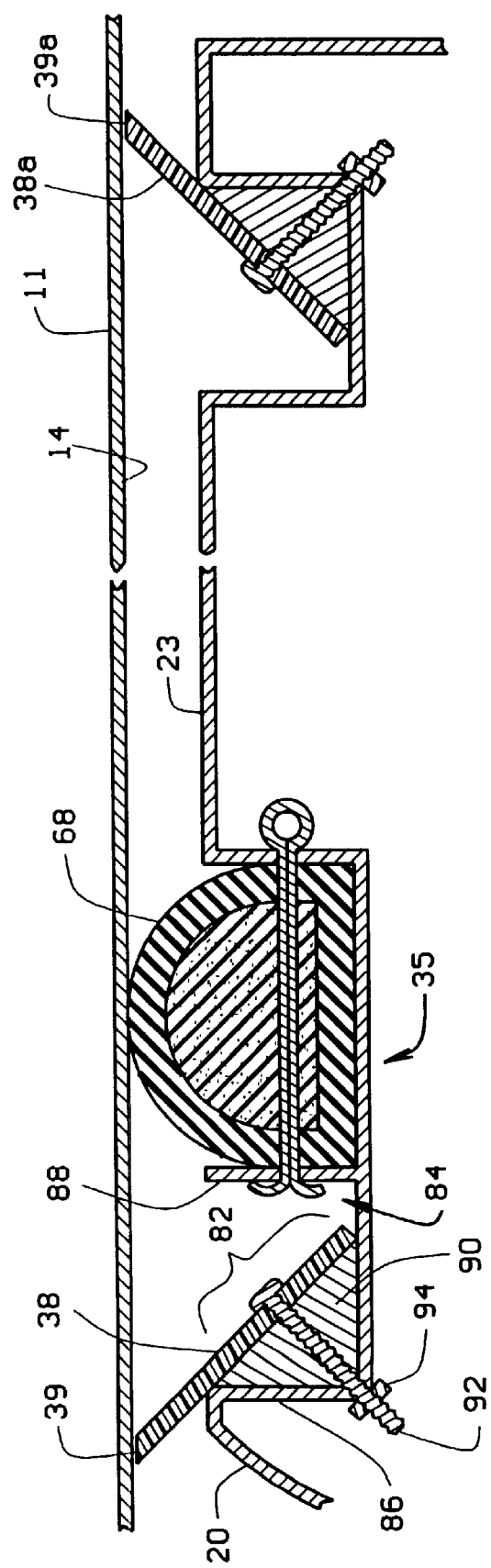
FIG. 5 is an enlarged sectional view of a portion of the piston showing the seal mounted in its channel with a pair of wipers coupled to the piston body.

With reference to FIGS. 1 and 5, the piston 18 may include an essentially annular wiper generally designated 38 preferably formed of a plastic such as nylon or the like. The wiper 38 in the embodiment shown extends about the piston 18 from the area forming a juncture between the curved front portion 20 and the cylindrical middle portion 23. The wiper 38 is angled upwardly relative to a major axis of the piston 18 towards the inner surface of the tank. If a wiper 38 is used it should extend at a 45θ angle relative to the piston axis. The end of the wiper 38 abutting the inner surface of the tank has a bevel 39 such that a flat portion of the bevel abuts the inner surface of the tank. This provides a wiping or scraping action against the inner surface of the tank to clean the same.

In the embodiment shown in FIGS. 1 through 5, the wiper 38 is mounted to the piston 18 by disposing a lower portion 82 of the wiper 38 within a circumferential groove or channel 84 axially spaced parallel to the seal channel 35. The channel 84 defines two sidewalls 86, 88. The sidewall 86 closest to the front of the piston 18 should be at 45° relative to the piston axis. If the sidewall 86 is vertical or at an angle other than 45°, a fill material 90 should be disposed against the sidewall 86 as shown in FIG. 5. The fill material 90 may be metal, polymer, or any other material that can provide a smooth 45° surface for the wiper 38. The wiper 38 may then be secured to the fill material 90 or angled sidewall as appropriate by means of a screw or nut 92 and a bolt 94. Optionally a second wiper 38a may be disposed near the rear of the piston 18, in mirror image to the first wiper 38 (i.e. the bevel 39a of the rear wiper 38a is oriented in the opposite direction of wiper 38).

Figure 6:
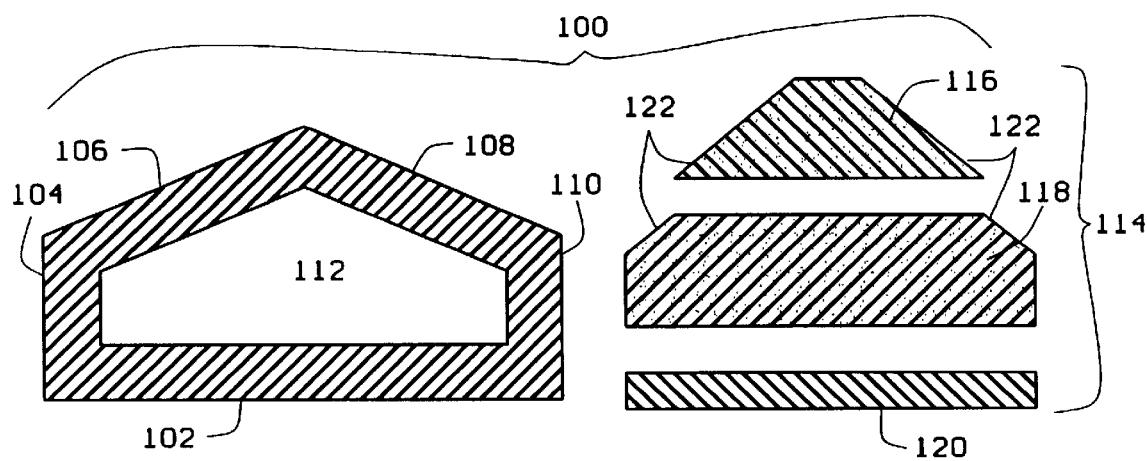
FIG. 6 is an exploded sectional view of the components in the preferred embodiment of the seal.
Figure 7:
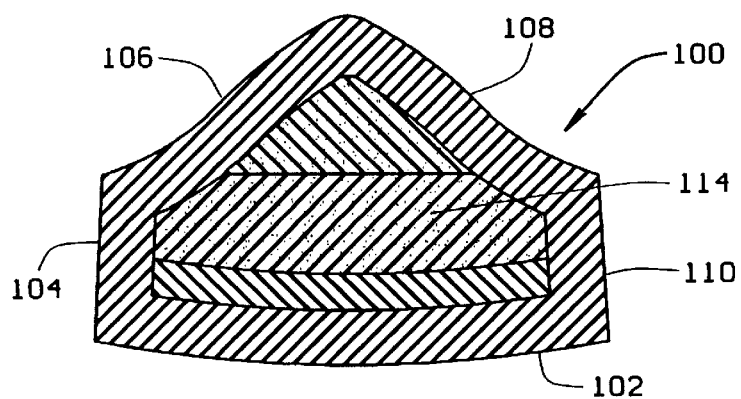
FIG. 7 is an enlarged sectional view of the assembled seal of FIG. 6.
Figure 8:
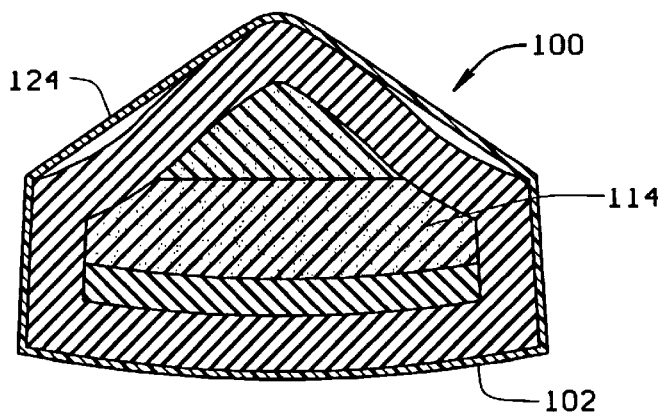
FIG. 8 is an enlarged sectional view of the seal of FIG. 7 with an optional friction reducing layer.

Referring now to FIGS. 6 through 8, a preferred embodiment of the seal 100 is shown generally. The seal 100 is similar to the seal 36 of FIGS. 2A, 4, and 2A. Unlike the seal 36, the seal 100 has an annular base portion 102 that is the same thickness as the wall portions, 104, 106, 108, and 110. A thickness of 0.375" has been discovered to be effective. The annular chamber 112 defined by the annular base 102 and the wall portions 104, 106, 108, and 110 is filled with the support assembly 114.

The support assembly 114 comprises one or more open cell foam material layers 116, 118 and a support strip 120. The support assembly 114 is combined into an integral part by placing an adhesive between the various components layers—the foam material layers 116, and 118 and the support strip 120. After the adhesive cures, the edges of the support assembly 114 are cut down, possibly with a band saw, to match the approximate profile of the annular chamber 112. FIG. 6 shows how the cuting has left beveled surfaces 122 on the support assembly 114 to correspond to the wall portions 106 and 108.

It is best if a small section of the support strip 120 extends beyond the open cell foam material layers 116, 118. This allows the entire support assembly 114 to be pulled through the annular chamber 112, the open cell foam material layers 116, 118, thus being compressed during this process. After the support assembly 114 is in place, it is given time to relax, the protruding portion is removed after which the ends of the two ends of the seal 100 may be glued together thereby forming a ring.

It has been discovered that a support strip of 0.25" works well with 0.375" walls in the seal. The support strip 120 is preferably made of the same material as the base portion 102 (and wall portions 104, 106, 108, 110). The support strip 120 performs two functions. It provides rigidity to the support assembly 114 facilitating its insertion into the annular chamber 112. It also provides extra support to the base portion 102 to limit the amount of bowing that occurs. In FIGS. 7 and 8 it can be seen that the base portion 102 will bow slightly even with the support strip 120. By the time the seal is formed into a ring and placed around the piston, this bowing becomes negligible. It should be noted that it is ideal not to have any gaps remaining in the annular chamber 112 after the support assembly 114 is in place. Of course this is not always possible, but any gaps should be kept to an absolute minimum. The compression of the open cell foam material layers as they are inserted into the chamber helps in this regard. Lastly, FIG. 8 shows that the optional outer layer 124 may be added to this embodiment similar to the outer layer 77 of FIG. 3A.

While the foregoing is directed to preferred embodiments of the present invention, other and further embodiments of the invention may be devised without departing from the basic scope thereof, and the scope thereof is determined by the claims, which follow.

What is claimed is:

1. In a tank of the storage and/or transport in bulk of semisolid and liquid materials, the tank having an outlet for discharging material contained therein and having a generally cylindrical inner surface, a generally cylindrical piston disposed within the tank and adapted to reciprocate therein, a circumferential channel disposed around the piston, and an annular seal disposed within the channel, the seal comprising:

an elastic essentially annular base;
a cap portion connected to said base, said base and the cap portion defining an essentially annular chamber therebetween, said cap portion extending into an apex;
a support assembly disposed within said annular chamber, said support assembly comprising one or more layers of an open cell foam material and one or more support strips; and
wherein said support assembly displaces nearly all of the space of said annular chamber.

2. The seal of claim 1, wherein said open cell foam material is rubber.

3. The seal of claim 1, wherein said open cell foam material is polyurethane.

4. The seal of claim 1, wherein said cap portion is defined by two parallel walls disposed perpendicular to said base, and a pair of angled walls connected to each other at one end to form an apex and connected at another end to one of said walls.

5. The seal of claim 1, further comprising an outer layer disposed around and surrounding said seal, said outer layer consisting of a material having a lower coefficient of kinetic friction than said seal.

6. The seal of claim 5, wherein said outer layer is made of a compound taken from the group consisting of Teflon, rayon, nylon, and high density alkenes.

7. The seal of claim 1, wherein said support strip, said annular base, and said cap portion all consist of the same material.

8. The seal of claim 7, wherein said support strip, said annular base, and said cap portion are made of a rubber taken from the group consisting of VITON®, neoprene, and nitrile.

9. In a tank of the storage and/or transport in bulk of semisolid and liquid materials, the tank having an outlet for discharging material contained therein and having a generally cylindrical inner surface, a generally cylindrical piston disposed within the tank and adapted to reciprocate therein, a circumferential channel disposed around the piston, and an annular seal disposed within the channel, the method of producing the seal comprising the steps of:

forming a sheath with an annular base portion and a cap portion, thereby creating an annular chamber within said annular base and cap portions;
 laminating a support assembly from one or more layers of an open cell foam material and at least one support strip, with an adhesive between any two adjacent open cell foam layers or support strips;
 cutting the edges of the support assembly to a cross-sectional profile that corresponds to the cross-sectional profile of said annular chamber;
 pulling said support assembly through said annular chamber; and
 connecting two ends of said sheath together to form a seal adapted to be disposed around the piston.

10. The method of claim 9, further comprising the step of compressing said support assembly simultaneously with said pulling step.

11. The method of claim 10, wherein said laminating is done to leave a portion of said support strip protruding from the remaining parts of said assembly, and further comprising the step of removing said protruding portion prior to said connecting step.

12. The method of claim 11, wherein said open cell foam material layers are rubber.

13. The method of claim 11, wherein said open cell foam material layers are polyurethane.

14. The method of claim 11, wherein said cap portion is defined by two parallel walls disposed perpendicular to said base, and a pair of angled walls connected to each other at one end to form an apex and connected to another end to one of said walls.

15. The method of claim 11, further comprising the step of wrapping an outer layer around said seal, said outer layer consisting of a material having a lower coefficient of kinetic friction than said seal.

16. The method of claim 15, wherein said outer layer is wrapped around said seal by means of heat shrinking.

17. The method of claim 15, wherein said outer layer is made of a compound taken from the group consisting of Teflon, rayon, nylon, and high density alkenes.

18. The method of claim 11, wherein said support strip, said annular base, and said cap portion all consist of the same material.

19. The method of claim 18, wherein said support strip, said annular base, and said cap portion are made of a rubber taken from the group consisting of VITON®, neoprene, and nitrile.

* * * * *